(12) United States Patent
Zhu et al.

(10) Patent No.: US 12,487,578 B2
(45) Date of Patent: Dec. 2, 2025

(54) DEVICE AND METHOD FOR MULTI-ENERGY FIELD INDUCED ATOMIC-SCALE COMPUTER NUMERICAL CONTROL (CNC) MACHINING IN ENVIRONMENTAL ATMOSPHERE

(71) Applicant: Zhejiang University, Hangzhou (CN)

(72) Inventors: Wule Zhu, Hangzhou (CN); Qi Sun, Hangzhou (CN); Sidong Wu, Hangzhou (CN); Bingchun Jia, Hangzhou (CN); Jingyuan Wang, Hangzhou (CN); Wei Gao, Hangzhou (CN); Fang Han, Hangzhou (CN); Caoyang Xue, Hangzhou (CN); Xiang Zhao, Hangzhou (CN); Weijian Zhang, Hangzhou (CN); Bingfeng Ju, Hangzhou (CN)

(73) Assignee: Zhejiang University, Hangzhou (CN)

( * ) Notice: Subject to any disclaimer, the term of this patent is extended or adjusted under 35 U.S.C. 154(b) by 0 days.

(21) Appl. No.: 19/015,374

(22) Filed: Jan. 9, 2025

(65) Prior Publication Data

US 2025/0147481 A1 May 8, 2025

(30) Foreign Application Priority Data

Mar. 1, 2024 (CN) .......................... 202410231816.9

(51) Int. Cl.
*G05B 19/406* (2006.01)
*G05B 19/21* (2006.01)
*H05K 9/00* (2006.01)

(52) U.S. Cl.
CPC ........... *G05B 19/406* (2013.01); *G05B 19/21* (2013.01); *H05K 9/0001* (2013.01); *G05B 2219/31379* (2013.01); *G05B 2219/49124* (2013.01)

(58) Field of Classification Search
CPC .................. G05B 19/406; G05B 19/21; G05B 2219/49124; G05B 2219/31379
See application file for complete search history.

(56) References Cited

U.S. PATENT DOCUMENTS 9,676,677 B2 * 6/2017 Freitas, Jr. .............. C07B 37/00
2005/0077468 A1 * 4/2005 Baur ...................... B82Y 40/00
250/307

(Continued)

FOREIGN PATENT DOCUMENTS

CN 102607976 A 7/2012
CN 102732885 A 10/2012

*Primary Examiner* — David E Smith (57) ABSTRACT

A device for multi-energy field induced atomic-scale CNC machining in an environmental atmosphere comprises an electromagnetic shielding chamber and a control mechanism, wherein an environmental chamber is arranged in the electromagnetic shielding chamber, a workpiece platform is arranged at the bottom of the environmental chamber, and a nanotool driven by a nanotool actuator is arranged at the top of the environmental chamber, and a gas inlet and a gas outlet which are connected to the environmental chamber are formed in the electromagnetic shielding chamber; and the control mechanism is used for controlling the workpiece platform and the nanotool actuator and applying energy fields including a force field, a temperature field, an electric field, an optical field and a magnetic field. The device has the advantages of atomic precision, high efficiency, low cost and good universality.

7 Claims, 5 Drawing Sheets (56) References Cited

U.S. PATENT DOCUMENTS

| | | |
|---|---|---|
| 2007/0212805 A1 | 9/2007 | Hartzell |
| 2024/0317578 A1 | 9/2024 | Kurokawa et al. |
| 2025/0011166 A1 | 1/2025 | Reiser et al. |

* cited by examiner

DEVICE AND METHOD FOR MULTI-ENERGY FIELD INDUCED ATOMIC-SCALE COMPUTER NUMERICAL CONTROL (CNC) MACHINING IN ENVIRONMENTAL ATMOSPHERE

CROSS-REFERENCE TO RELATED APPLICATIONS

This application claims priority to Chinese Patent Application No. 202410231816.9 with a filing date of Mar. 1, 2024. The content of the aforementioned application, including any intervening amendments thereto, is incorporated herein by reference.

BACKGROUND OF THE INVENTION

1. Technical Field

The disclosure belongs to the field of atomic and close-to-atomic scale extreme manufacturing, and particularly relates to a device and method for multi-energy field induced atomic-scale computer numerical control (CNC) machining in an environmental atmosphere.

2. Description of Related Art

The manufacturing technology has experienced the stages of macroscopic manual manufacturing, mesoscopic mechanical manufacturing and micro-nano optical manufacturing, and the current manufacturing process of semiconductor devices has also reached the forefront of the 3 nm technology node. With the development of information devices towards a smaller size, lower power consumption and higher performance, the manufacturing technology will certainly reach the atomic scale. Achieving material removal or addition with single-atom precision breaks through existing physical limits, provides a solution to manufacturing of minimal-scale and ultra-high-precision devices, such as quantum chips, cold atom interference gyroscopes and aviation heat-resistant coatings, and is of great significance for the development of national major strategic fields, such as the national defense and military industry, aerospace, integrated circuits, information storage, energy and health care. Existing nanomanufacturing techniques include single-point diamond turning, nanoimprinting, focused ion beam etching, wet etching, optical lithography, electron beam lithography, atomic layer deposition, atomic layer etching, the use of low-temperature ultrahigh-vacuum scanning tunneling microscopes for direct control of a single atom, etc.

As for single-point diamond turning, for example, Chinese Invention Patent Publication No. CN114378532A discloses an electrochemical polishing method based on a single-point diamond turning surface, but the material removal depth of this method can only be controlled to the nano scale. As for nanoimprinting and focused ion beam etching, for example, Chinese Invention Patent Publication No. CN113126428A discloses a nanoimprinting method and Chinese Invention Patent Authorization and Publication No. CN112735936B discloses an optical microswitch machining method based on inductively coupled plasmas and focused ion beam etching. These methods can fulfill a higher precision and have the advantages of being free of masks and chemical substances, but they cannot avoid subsurface damage. As for wet etching, optical lithography, electron beam lithography, for example, Chinese Invention Patent Authorization and Publication No. CN104037061B discloses a method for direct electron beam nanolithography or printing in a wet environment, but this method requires chemical substances or masks and cannot control the precision to the single-atom level. Atomic layer deposition and atomic layer etching are effective approaches for realizing atomic-scale material surface manufacturing, for example, Chinese Invention Patent Publication No. CN114864370A discloses a method for quick free deposition or etching of an atomic layer, but this method uses masks for area selection and comprises complex processing steps. A low-temperature ultrahigh-vacuum scanning tunneling microscope can be used to directly control a single atom, but it relies on a strict experimental environment, has low control efficiency, and can only be used for materials with good electrical conductivity such as metals.

BRIEF SUMMARY OF THE INVENTION

The objective of the disclosure is to provide a device and method for multi-energy field induced atomic-scale CNC machining in an environmental atmosphere to solve the problems that existing atomic-precision manufacturing methods rely on an ultra-high vacuum and ultra-low temperature environment, use masks for area selection, cannot avoid subsurface lattice damage, and cannot stably and efficiently remove or deposit specific atoms.

To solve the above technical problems, the disclosure provides the following technical solutions:

The disclosure relates to a device for multi-energy field induced atomic-scale CNC machining in an environmental atmosphere, comprising an electromagnetic shielding chamber and a control mechanism, wherein an environmental chamber is formed in the electromagnetic shielding chamber, a workpiece platform is arranged at a bottom of the environmental chamber, and a nanotool driven by a nanotool actuator is arranged at a top of the environmental chamber, a workpiece is placed on the workpiece platform and is allowed to move in an X-axis direction and a Y-axis direction, the nanotool actuator is used for controlling the nanotool to move above the workpiece platform in the X-axis direction, the Y-axis direction and a Z-axis direction, a gas inlet and a gas outlet which are connected to the environmental chamber are formed in the electromagnetic shielding chamber, an active medium is delivered into the environmental chamber via the gas inlet, and exhaust gas is discharged from the environmental chamber via the gas outlet; and the control mechanism is used for controlling the workpiece platform and the nanotool actuator and applying energy fields into the environmental chamber to change an environmental atmosphere, and the energy fields comprise a force field, a temperature field, an electric field, an optical field and a magnetic field;

Preferably, the workpiece platform comprises a vibration isolation platform, an xy-axis motor motion platform and a heating stage which are sequentially arranged from bottom to top, the vibration isolation platform is used for reducing vibrations, the xy-axis motor motion platform is used for driving the workpiece to move in the X-axis direction and the Y-axis direction, and the heating stage is used for applying the temperature field.

Preferably, the nanotool actuator comprises a z-axis motor motion platform, an xyz-axis piezoceramic scanner tube and a tool fixture which are sequentially arranged from top to bottom; the tool fixture is used for clamping the nanotool; the xyz-axis piezoceramic scanner tube is used for driving the nanotool to move in the X-axis direction, the Y-axis direction and the Z-axis direction to realize fine positioning of the nanotool and applying the force field to a surface of the workpiece by means of the nanotool; and the z-axis motor motion platform is used for driving the nanotool to move in the Z-axis direction to realize coarse positioning of the nanotool.

Preferably, the control mechanism comprises:
- a motor motion controller, used for controlling the xy-axis motor motion platform and the z-axis motor motion platform;
- a piezoceramic motion controller, used for controlling the xyz-axis piezoceramic scanner tube; and
- an energy field controller, used for changing the force field, the temperature field, the electric field, the optical field and the magnetic field in the environmental chamber.

Preferably, the control mechanism further comprises a temperature and humidity controller used for controlling an environment in the environmental chamber, including a temperature and a humidity in the environmental chamber.

Preferably, a three-way valve is connected to the gas inlet, three channels of the three-way valve are respectively connected to two active medium sources and an inert gas source, and mass flow controllers are arranged in the three channels respectively.

Preferably, the nanotool is made from a material with a photo-electro-magnetic activity and has a Mohs hardness less than 6.

The disclosure further relates to a method for CNC machining based on the device for multi-energy field induced atomic-scale CNC machining in an environmental atmosphere, comprising the following steps:

S1, fixing the workpiece on the workpiece platform, controlling temperature and humidity fields in the environmental chamber by the control mechanism, and moving the nanotool to a machining position by the control mechanism, and S2: cyclically feeding an active medium into the environmental chamber; controlling, by the control mechanism, a force field, an electric field, an optical field and a magnetic field in the environmental chamber to induce the formation of chemical bonds between the nanotool, the active medium and surface atoms of the workpiece, weaken chemical bond strength between the surface atoms and sublayer atoms of the workpiece or strengthen the binding between medium atoms and the surface atoms of the workpiece; and controlling the movement of the nanotool by the control mechanism, which causes the chemical bonds between the surface atoms and sublayer atoms of the workpiece to break and remove the surface atoms or causes the medium atoms to be deposited on the surface atoms of the workpiece.

Preferably, a force range of the force field is 0-100 μN; a temperature range of the temperature field is 0-500° C.; a voltage between the workpiece and the nanotool is within −100 V-+100 V; a waveband of the optical field is from an ultraviolet band to an infrared band, and a power range of the optical field is 10 mW-10 W; the magnetic field between the workpiece and the nanotool ranges from −10 T to +10 T, and in S2, and S3, a temperature in the environmental chamber is maintained at 0° C.-500° C., and a relative humidity in the environmental chamber is controlled to 30%-80%.

Preferably, the active medium is a liquid or gas carrying target atoms.

Compared with the prior art, the disclosure has the following beneficial effects:

The device for multi-energy field induced atomic-scale CNC machining in an environmental atmosphere provided by the disclosure comprises the control mechanism, which is not only used to control the workpiece platform and the nanotool actuator, but also apply energy fields, including a force field, a temperature field, an electric field, an optical field and a magnetic field, and then changes the environmental atmosphere inside the environmental chamber; when the device is used for machining, by changing the energy field, chemical bonds are formed between the nanotool, the active medium and the surface atoms of the workpiece, and the chemical bond strength of the surface atoms and sublayer atoms of the workpiece is weakened, or the binding of medium atoms and the surface atoms of the workpiece is strengthened, so as to achieve atomic-level removal and deposition, thus solving the contradiction between atomic-scale accurate manufacturing and a high material removal/deposition rate; the hardness of the tool is far lower than that of the workpiece, and an applied load is far less than a yield limit of the workpiece, and machining mainly relies on enhanced chemical reactions on a nanotool-workpiece interface with the aid of the energy fields, such that subsurface lattice damage and other problems can be avoided; masks are not needed; machining can be carried out in the atmosphere at normal temperature and pressure, with low cost and good versatility.

BRIEF DESCRIPTION OF THE SEVERAL VIEWS OF THE DRAWINGS

wherein: 1, active medium A source; 2, inert gas source; 3, active medium B source; 4, mass flow controller; 5, active medium molecule; 6, vibration isolation platform; 7, xy-axis motor motion platform; 8, heating stage; 9, workpiece; 10, workpiece atoms; 11, nanotool; 12, tool fixture; 13, xyz-axis piezoceramic scanner tube; 14, z-axis motor motion platform; 15, byproduct molecule; 16, environmental chamber; 17, electromagnetic shielding chamber; 18, energy field controller; 19, temperature and humidity controller; 20, motor motion controller; 21, piezoceramic motion controller.

DETAILED DESCRIPTION OF THE INVENTION

The technical solutions of the disclosure are described in further detail below with reference to specific embodiments, which are used for describing the disclosure rather than limiting the disclosure. All other embodiments obtained by those ordinarily skilled in the art based on the following ones without creative labor should also fall within the protection scope of the disclosure.

Embodiment 1

Figure 1:
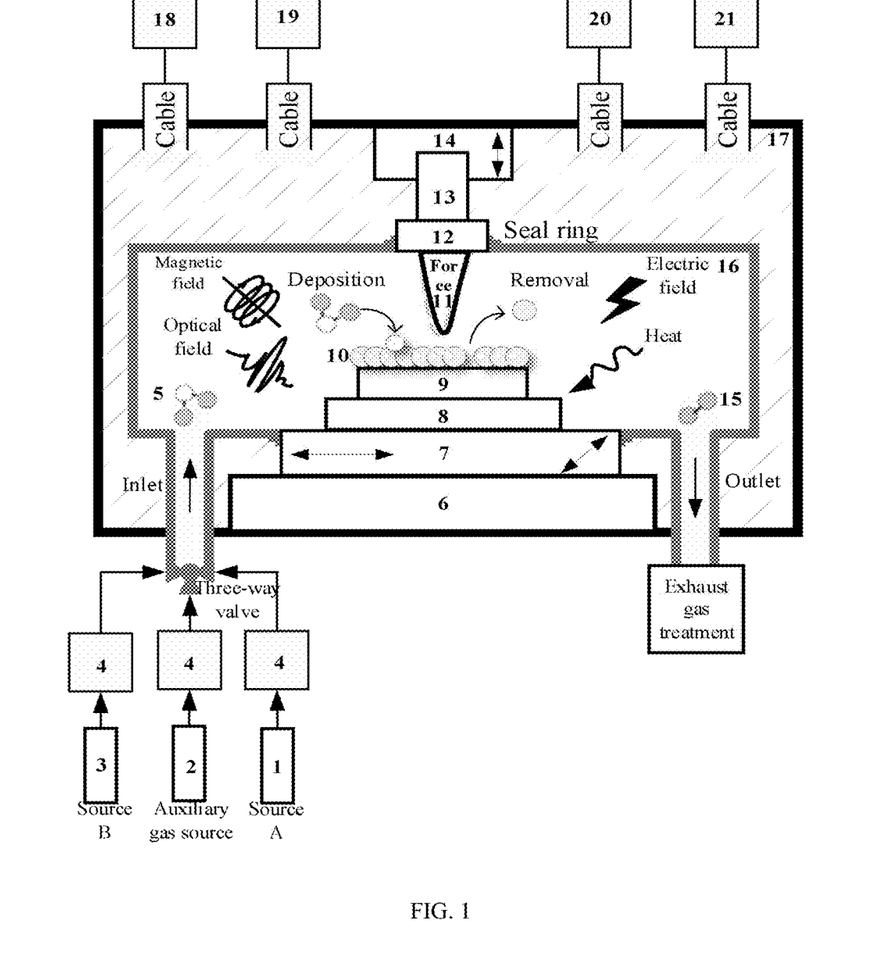
FIG. 1 is a schematic structural diagram of a device for multi-energy field induced atomic-scale CNC machining in an environmental atmosphere.

Referring to FIG. 1, this embodiment relates to a device for multi-energy field induced atomic-scale CNC machining in an environmental atmosphere, comprising an electromagnetic shielding chamber 17 and a control mechanism.

An environmental chamber 16 is formed in the electromagnetic shielding chamber 17, a workpiece platform is arranged at the bottom of the environmental chamber 16, and a nanotool 11 driven by a nanotool actuator is arranged at the top of the environmental chamber 16. The nanotool 11 is made from a material which has a nano-radius, a force induction capacity, a Mohs hardness less than 6 and a photo-electro-magnetic activity, such as nickel, gold, silver, platinum, palladium, cobalt or other precious metal materials, molybdenum oxide, titanium oxide, cerium oxide, zinc oxide or other metal oxide materials, and carbon-based, silicon-based, nitrate or other composite materials comprising metal elements and nonmetal elements. A workpiece 9 is placed on the workpiece platform and is allowed to move in an X-axis direction and a Y-axis direction. The workpiece platform specifically comprises a vibration isolation platform 6, an xy-axis motor motion platform 7 and a heating stage 8 which are sequentially arranged from bottom to top, wherein the vibration isolation platform 6 is used for reducing vibrations, the xy-axis motor motion platform 7 is used for driving the workpiece 9 to move in the X-axis direction and the Y-axis direction and can withstand a high temperature and resist corrosion, and the heating stage 8 is used for applying a temperature field. The nanotool actuator is used for controlling the nanotool 11 to move above the workpiece platform in the X-axis direction, the Y-axis direction and a Z-axis direction and specifically comprises a z-axis motor motion platform 14, an xyz-axis piezoceramic scanner tube 13 and a tool fixture 12 which are sequentially arranged from top to bottom, wherein the tool fixture 12 is used for clamping the nanotool 11, the xyz-axis piezoceramic scanner tube 13 is used for driving the nanotool 11 to move in the X-axis direction, the Y-axis direction and the Z-axis direction to realize fine positioning of the nanotool and applying a force field to a surface of the workpiece by means of the nanotool, the z-axis motor motion platform 14 is used for driving the nanotool 11 to move in the Z-axis direction to realize coarse positioning of the nanotool, and the xyz-axis piezoceramic scanner tube 13 and the z-axis motor motion platform 14 can withstand a high temperature and resist corrosion. A gas inlet and a gas outlet which are connected to the environmental chamber 16 are formed in the electromagnetic shielding chamber 17, and the active medium is delivered into the environmental chamber 16 via the gas inlet. The active medium is a liquid or gas carrying target atoms, such as elementary substances, halides or other inorganic substances, metal alkyl, metal cyclopentadienyl, metal β-2 ketone, metal amide, metal ether or other metal organic substances, or plasma such as hydrogen plasma, oxyhydrogen plasma, oxygen plasma, fluorine plasma, argon plasma, helium plasma, hydrogen peroxide plasma and ozone plasma. Exhaust gas is discharged from the environmental chamber 16 via the gas outlet. A three-way valve is connected to the gas inlet, three channels of the three-way valve are respectively connected to two active medium sources and an inert gas source 2, and mass flow controllers 4 are arranged in the three channels respectively.

The control mechanism comprises a motor motion controller 20, a piezoceramic motion controller 21, a temperature and humidity controller 19 and an energy field controller 18, wherein the motor motion controller 20 is used for controlling the xy-axis motor motion platform 7 and the z-axis motor motion platform 14 to allow the workpiece platform to move in the X-axis direction and the Y-axis direction and the nanotool 11 to move in the Z-axis direction to realize coarse positioning of the nanotool; the piezoceramic motion controller 21 is used for controlling the xyz-axis piezoceramic scanner tube 13 to allow the nanotool 11 to move in the X-axis direction and the Y-axis direction to realize accurate control of the workpiece platform and the nanotool 11, and applying the force field to the surface of the workpiece by means of the nanotool 11; the temperature controller 19 is used for controlling the temperature and humidity in the environmental chamber 16; the energy field controller 18 is used for changing a force field, a temperature field, an electric field, an optical field and a magnetic field in the environmental chamber 16, specifically, the nanotool is fed by means of the xyz-axis piezoceramic scanner tube 13 to apply the force field to the surface of the workpiece 9, the temperature field is applied to the workpiece 9 by means of the heating stage 8, the electric field is applied between the workpiece and the nanotool by means of a signal generator and a power amplifier, the optical field is applied to the surface of the workpiece 9 by means of a combined laser device, a collimator, an optical fiber coupler and an optical fiber, and the magnetic field is applied between the workpiece and the nanotool by means of an electromagnet; and the magnitude of the energy fields is maintained constant by means of the energy field controller 18 to change the environmental atmosphere in the environmental chamber 18.

Embodiment 2

Figure 2:
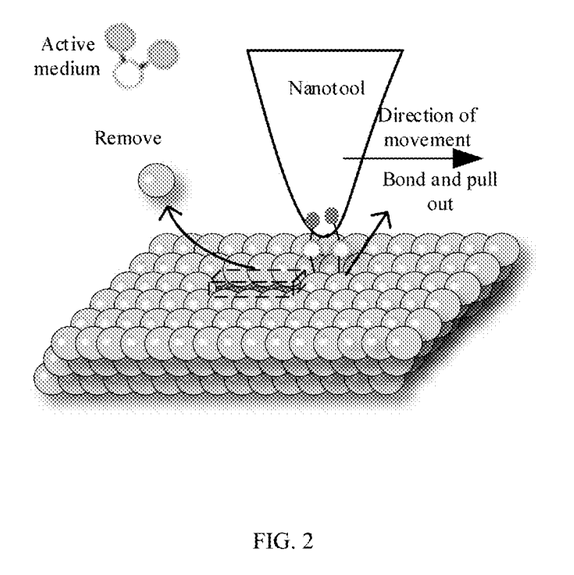
FIG. 2 is a schematic diagram of surface atom removal by means of the device for multi-energy field induced atomic-scale CNC machining in an environmental atmosphere.

This embodiment relates to a method for multi-energy field induced atomic-scale CNC machining in an environmental atmosphere, which is specifically a subtractive manufacturing method and comprises the following steps:

S1, the workpiece 9 is fixed to the workpiece platform shown in FIG. 1, and the temperature and humidity in the environmental chamber 16 are controlled and maintained constant by means of the temperature and humidity controller 19, wherein the temperature is maintained at 0° C.-500° C., and the relative humidity in the environmental chamber 16 is controlled to 30%-80%; the position of the workpiece 9 and the position and height of the nanotool 11 are changed by means of the motor motion controller 20 to move the nanotool 11 to a machining position and allow the nanotool 11 to be in contact with the surface of the workpiece 9; and S2, an active medium, which is a liquid or gas carrying target atoms, is circularly fed into the environmental chamber 16, the flow rate of the active medium is controlled by the mass flow controllers 4, and a force field, a temperature field, an electric field, an optical field and a magnetic field in the environmental chamber 16 are controlled by the energy field controller 18, wherein a force range of the force field is 0-100 μN; a temperature range of the temperature field is 0-500° C.; a voltage between the workpiece and the nanotool is within −100 V-0 V; a waveband of the optical field is from an ultraviolet band to an infrared band, and a power range of the optical field is 10 mW-10 W; the magnetic field between the workpiece and the nanotool ranges from −10 T to 0 T. With the assistance of these specific energy fields, activation energy of an interface chemical reaction is reduced, such that active medium molecules 5 nearby are adsorbed onto the nanotool 11 and the surface of the workpiece 9 to induce chemical bonds to be formed between the nanotool 11, the active medium and surface atoms of the workpiece 9, and the strength of chemical bonds between the surface atoms and sublayer atoms of the workpiece 9 is weakened; and the piezoceramic motion controller 21 controls the nanotool 11 to move to shear off and break the chemical bonds between the surface atoms and the sublayer atoms of the workpiece 9, that is, atoms of the active medium pull out the surface atoms of the workpiece 9 to realize atom removal, as shown in FIGS. 1 and 2.

Figure 4:
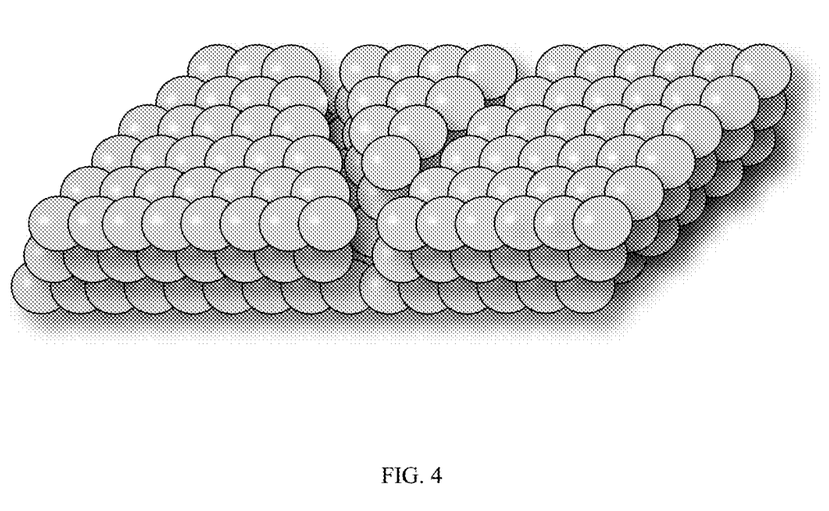
FIG. 4 is a schematic diagram of multi-energy field induced atomic-scale CNC subtractive manufacturing in an environmental atmosphere.

By means of the method for multi-energy field induced atomic-scale CNC machining in an environmental atmosphere in Embodiment 2, the atoms of the active medium will pull out the surface atoms of the workpiece 9 with the movement of the nanotool 11 in each period, such that atomic-precision controllable multi-layer removal is realized. An atomic-precision pattern "V" shown in FIG. 4 is finally obtained by etching.

Embodiment 3

Figure 3:
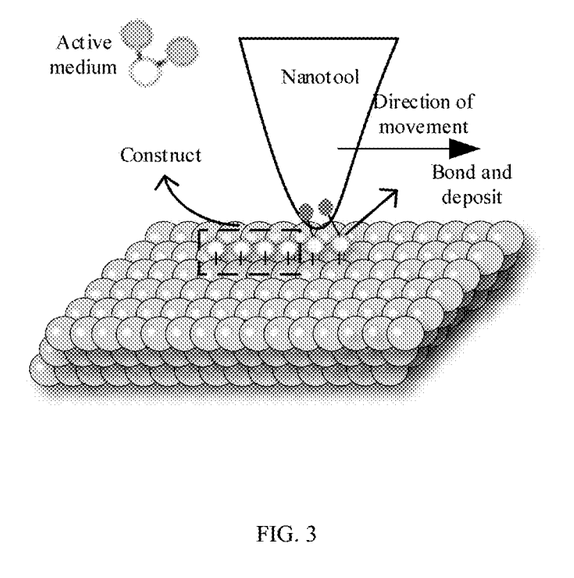
FIG. 3 is a schematic diagram of selective deposition on surface atoms of a workpiece by means of the device for multi-energy field induced atomic-scale CNC machining in an environmental atmosphere.
Figure 5:
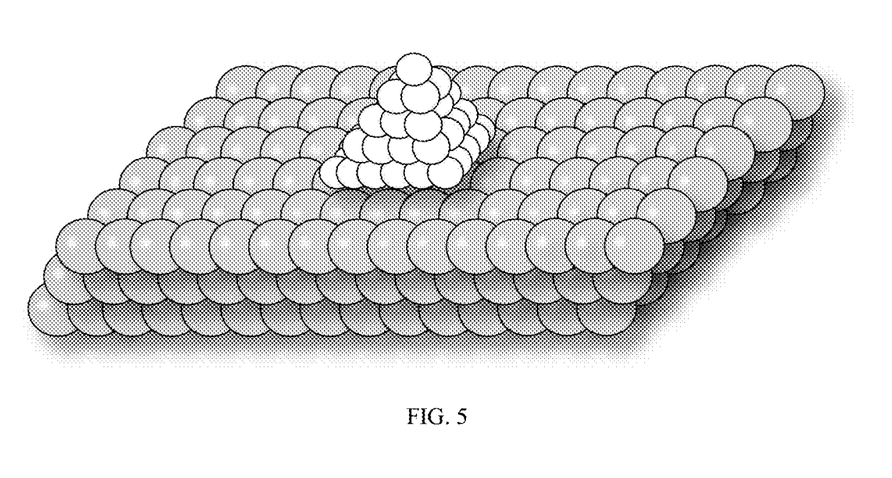
FIG. 5 is a schematic diagram of multi-energy field induced atomic-scale CNC additive manufacturing in an environmental atmosphere.

This embodiment relates to a method for multi-energy field induced atomic-scale CNC machining in an environmental atmosphere, which is specifically an additive manufacturing method and comprises the following steps:

S1, the workpiece 9 is fixed to the workpiece platform shown in FIG. 1, the temperature and humidity in the environmental chamber 16 are controlled and maintained constant by means of the temperature and humidity controller 19, wherein the temperature is maintained at 0° C.-500° C., and the relative humidity in the environmental chamber 16 is controlled to 30%-80%; an active medium is a liquid or gas carrying target atoms, and the nanotool 11 is moved to a machining position by means of the control mechanism; and S2: the active medium is circularly fed into the environmental chamber 16, for example, an active medium A source feeds an active medium A; a force field, a temperature field, an electric field, an optical field and a magnetic field in the environmental chamber 16 are controlled by the energy field controller 18, wherein a force range of the force field is 0-100 µN; a temperature range of the temperature field is 0-500° C.; a voltage between the workpiece and the nanotool is within 0 V-+100 V; a waveband of the optical field is from an ultraviolet band to an infrared band, and a power range of the optical field is 10 mW-10 W; the magnetic field between the workpiece and the nanotool ranges from 0 T to +10 T; under the action of these specific energy fields, activation energy of an interface chemical reaction is reduced, such that chemical bonds are induced to be formed between the nanotool 11, the active medium and surface atoms of the workpiece 9, and the binding between medium and the surface atoms of the workpiece 9 is strengthened; the piezoceramic motion controller 21 controls the nanotool 11 to move to allow target atoms of the active medium A to be bonded and deposited on the surface atoms of the workpiece 9, and byproduct molecules 15 are generated; then, an inert gas source 2 feeds an inert gas into the environmental chamber 16, the inert gas purges the active medium A and the byproduct molecules 15; then, an active medium B source 3 feeds an active medium B capable of reacting with the deposited atoms, and the force field, the temperature field, the electric field, the optical field and the magnetic field in the environmental chamber 16 are controlled by the energy field controller 18, wherein the force range of the force field is 0-100 µN; the temperature range of the temperature field is 0-500° C.; the voltage between the workpiece and the nanotool is within 0 V-+100 V; the waveband of the optical field is from the ultraviolet band to the infrared band, and the power range of the optical field is 10 mW-10 W; the magnetic field between the workpiece and the nanotool ranges from 0 T to +10 T. Under these specific energy fields, the piezoceramic motion controller 21 controls the nanotool 11 to move to allow target atoms of the active medium B to be bonded and deposited on the target atoms of the active medium A, and byproduct molecules 15 are generated, the active medium B and the byproduct molecules 15 are purged with the inert gas, then the active medium A capable of reacting with the deposited atoms is fed, and as shown in FIGS. 1 and 3, this step is repeated to realize atomic-precision controllable multi-layer deposition. In this way, deterministic surface additive manufacturing is realized, and an atomic-precision "pyramid" pattern shown in FIG. 5 is obtained by deposition.

The principle and implementation of the disclosure are expounded above with reference to specific embodiments, and the description of the above embodiments is merely used to help understand the method and core concept of the disclosure. Those ordinarily skilled in the art can make modifications to the specific implementation and application scope of the disclosure based on the concept of the disclosure. The description here should not be construed as limitations of the disclosure.

What is claimed is:

1. A device for computer numerical control (CNC) machining in an environmental atmosphere, comprising an electromagnetic shielding chamber and a control mechanism, wherein an environmental chamber is formed in the electromagnetic shielding chamber, a workpiece platform is arranged at a bottom of the environmental chamber, and a nanotool driven by a nanotool actuator is arranged at a top of the environmental chamber, the workpiece platform is configured to place a workpiece and to allow the workpiece to move in an X-axis direction and a Y-axis direction, the nanotool actuator is used for controlling the nanotool to move above the workpiece platform in the X-axis direction, the Y-axis direction and a Z-axis direction, a gas inlet and a gas outlet which are connected to the environmental chamber are formed in the electromagnetic shielding chamber, an active medium is delivered into the environmental chamber via the gas inlet, and exhaust gas is discharged from the environmental chamber via the gas outlet; and the control mechanism is used for controlling the workpiece platform and the nanotool actuator; the environment chamber is equipped with an xyz-axis piezoceramic scanner tube configured to generate a force field; a heating stage configured to generate a temperature field; a signal generator and a power amplifier configured to generate an electric field; a combined laser device, a collimator and an optical fiber coupler configured to generate an optical field; and an electromagnet configured to generate a magnetic field;

a force range of the force field is 0~100 µN; a temperature range of the temperature field is 0~500° C.; a voltage between the workpiece and the nanotool is within −100 V~+100 V; a waveband of the optical field is from an ultraviolet band to an infrared band, and a power range of the optical field is 10 mW~10 W; the magnetic field between the workpiece and the nanotool ranges from −10 T to 10 T, a temperature in the environmental chamber is maintained at 0° C.~500° C., and a relative humidity in the environmental chamber is controlled to 30% ~80%;

the nanotool is made from one or more material selected from a group consisting of nickel, gold, silver, platinum, palladium, cobalt molybdenum oxide, titanium oxide, cerium oxide, zinc oxide; the active medium is one or more selected from a group consisting of metal cyclopentadienyl, metal β-2 ketone, metal amide; the workpiece is made of diamond.

2. The device according to claim 1, wherein the workpiece platform comprises a vibration isolation platform, an xy-axis motor motion platform and the heating stage which are sequentially arranged from bottom to top, the vibration isolation platform is used for reducing vibrations, the xy-axis motor motion platform is used for driving the workpiece to move in the X-axis direction and the Y-axis direction, and the heating stage is used for applying the temperature field.

3. The device according to claim 2, wherein the nanotool actuator comprises a z-axis motor motion platform, the xyz-axis piezoceramic scanner tube and a tool fixture which are sequentially arranged from top to bottom; the tool fixture is used for clamping the nanotool; the xyz-axis piezoceramic scanner tube is used for driving the nanotool to move in the X-axis direction, the Y-axis direction and the Z-axis direction to realize fine positioning of the nanotool and applying the force field to a surface of the workpiece by means of the nanotool; and the z-axis motor motion platform is used for driving the nanotool to move in the Z-axis direction to realize coarse positioning of the nanotool.

4. The device according to claim 3, wherein the control mechanism comprises:
- a motor motion controller, used for controlling the xy-axis motor motion platform and the z-axis motor motion platform;
- a piezoceramic motion controller, used for controlling the xyz-axis piezoceramic scanner tube; and
- an energy field controller, used for changing the force field, the temperature field, the electric field, the optical field and the magnetic field in the environmental chamber.

5. The device according to claim 4, wherein the control mechanism further comprises a temperature and humidity controller used for controlling an environment in the environmental chamber.

6. The device according to claim 1, wherein a three-way valve is connected to the gas inlet, three channels of the three-way valve are respectively connected to two active medium sources and an inert gas source, and mass flow controllers are arranged in the three channels respectively.

7. A method CNC machining in an environmental atmosphere using on the device according to claim 1, comprising the following steps:
- S1, fixing the workpiece on the workpiece platform, controlling temperature and humidity fields in the environmental chamber by the control mechanism, and moving the nanotool to a machining position by the control mechanism; and
- S2: cyclically feeding the active medium into the environmental chamber; and controlling, by the control mechanism, the force field, the electric field, the optical field and the magnetic field in the environmental chamber to induce the formation of chemical bonds between the nanotool, the active medium and surface atoms of the workpiece, weaken chemical bond strength between the surface atoms and sublayer atoms of the workpiece or strengthen the binding between medium atoms and the surface atoms of the workpiece; and controlling, by the control mechanism, the movement of the nanotool, which causes the chemical bonds between the surface atoms and sublayer atoms of the workpiece to break and remove the surface atoms, or causes the medium atoms to be deposited on the surface atoms of the workpiece;

the nanotool is made of one or more material selected from a group consisting of nickel, gold, silver, platinum, palladium, cobalt molybdenum oxide, titanium oxide, cerium oxide, zinc oxide; the active medium is one or more selected from a group consisting of metal cyclopentadienyl, metal β-2 ketone, metal amide; the workpiece is made of diamond;

a force range of the force field is 0-100 μN; a temperature range of the temperature field is 0~500° C.; a voltage between the workpiece and the nanotool is within −100 V~+100 V; a waveband of the optical field is from an ultraviolet band to an infrared band, and a power range of the optical field is 10 mW~10 W; the magnetic field between the workpiece and the nanotool ranges from −10 T to +10 T; a temperature in the environmental chamber is maintained at 0° C.~500° C., and a relative humidity in the environmental chamber is controlled to 30% ~80%.

\* \* \* \* \*